March 9, 1937.  C. SIEMIANA  2,073,322
AUTOMATIC AXLE ADJUSTER
Filed June 24, 1935   3 Sheets-Sheet 3
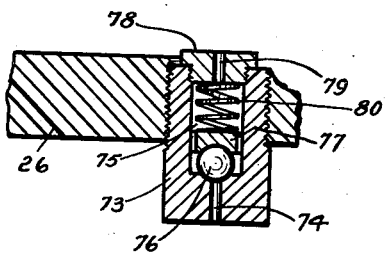
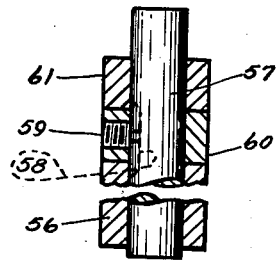
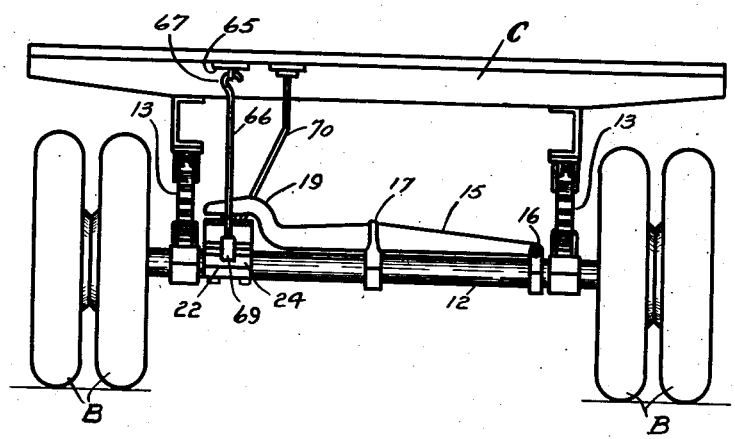
INVENTOR.
Casimir Siemiana.
BY Frank C Harman.
ATTORNEY.

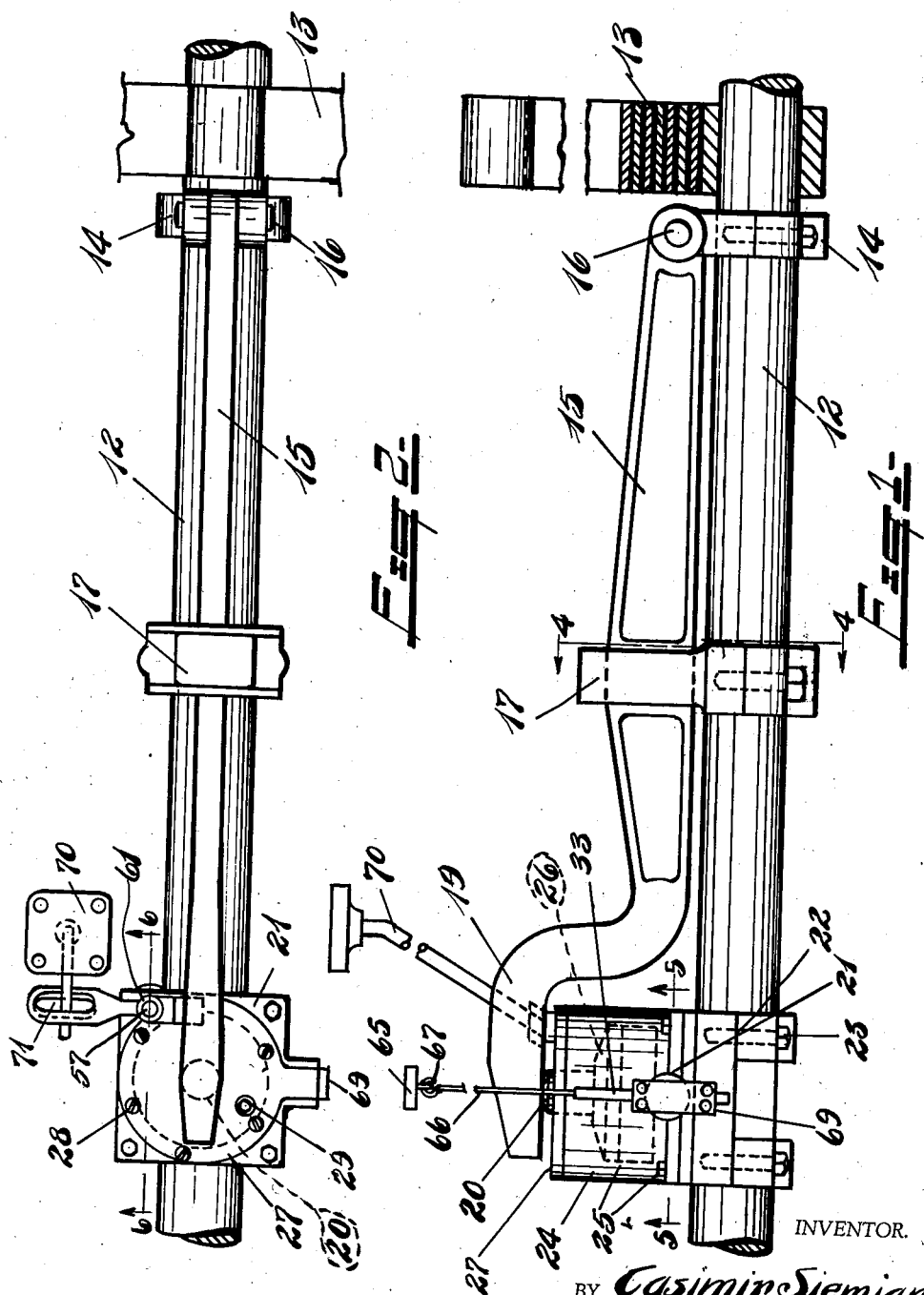

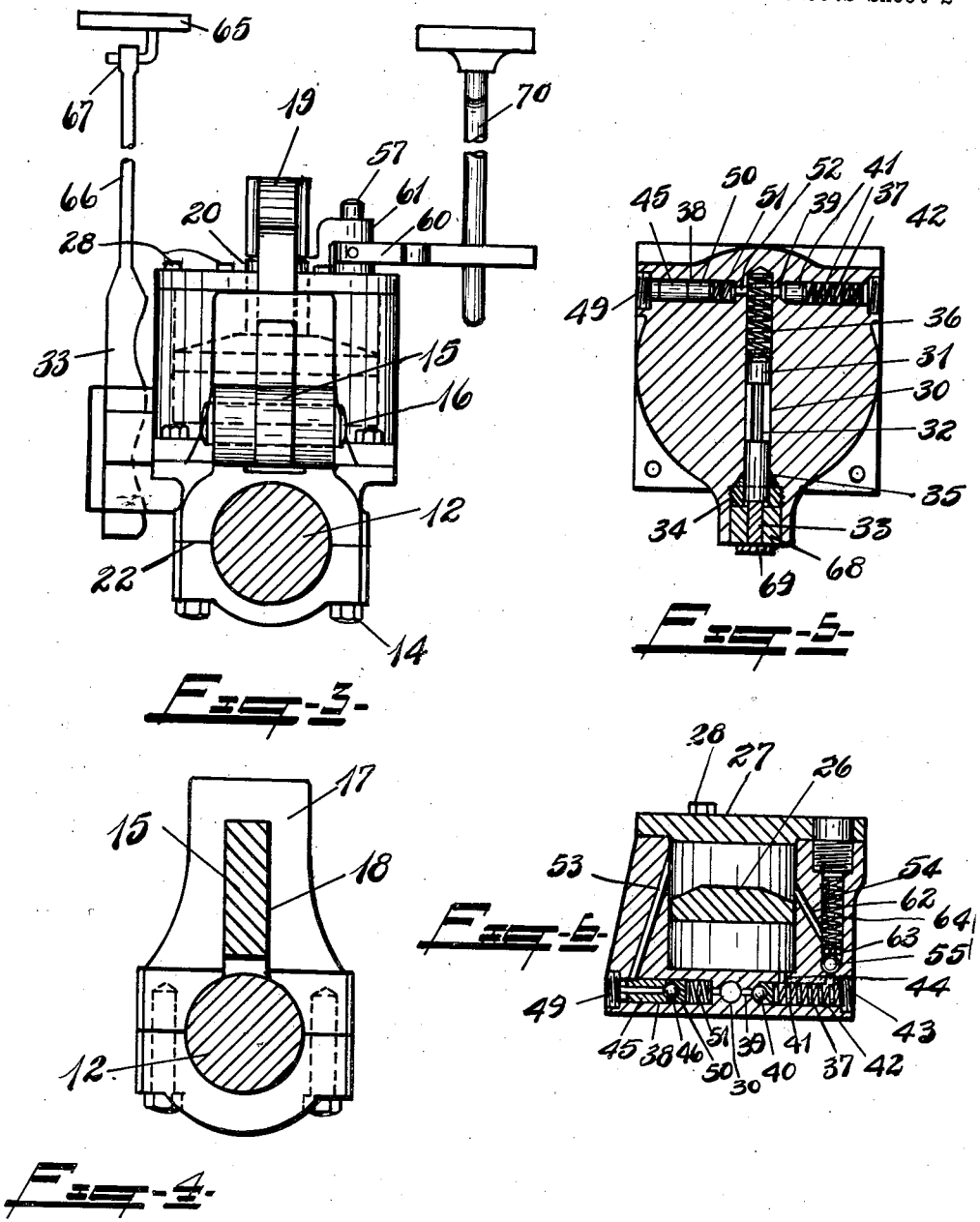

Patented Mar. 9, 1937

2,073,322

UNITED STATES PATENT OFFICE 2,073,322

AUTOMATIC AXLE ADJUSTER

Casimir Siemiana, Bay City, Mich.

Application June 24, 1935, Serial No. 28,224

10 Claims. (Cl. 280—80)

This invention relates to axle adjusting mechanism for use in connection with vehicles and the like, and more particularly to automatic axle adjusting mechanism which automatically operates to at all times keep the vehicle axle true and in proper horizontal alignment.

Another object is to design an adjusting mechanism which is readily applicable to vehicle axles already in use, as well as to vehicles in the process of manufacture.

A further object is to provide an axle adjusting mechanism which insures true axle alignment, and, consequently, proper and even tire wear and bearing, also increased traction, and thus increasing the life of the vehicle axle, tires, and associated parts.

A still further object is to design an axle adjusting mechanism which can be economically manufactured, which can be readily applied or detached, and which is fully automatic in operation.

The above and other objects will appear as the specification progresses, reference being had to the accompanying drawings in which I have shown the preferred embodiment of my invention, and in which like reference numerals indicate like parts throughout the several views thereof.

In the drawings:—

Fig. 1 is a fragmentary rear view of my automatic adjusting mechanism, illustating it associated with the axle.

Fig. 2 is an enlarged plan view.

Fig. 3 is an end view.

Fig. 4 is a transverse sectional view through the axle and lever beam, taken on the line 4—4 of Fig. 1.

Fig. 5 is a section taken on the line 5—5 of Fig. 1.

Fig. 6 is also a section taken on the line 6—6 of Fig. 2.

Fig. 7 is an enlarged detail of the equalizing valve showing it mounted in the piston.

Fig. 8 is also an enlarged detail of the pressure regulating mechanism.

Fig. 9 is a fragmentary side view of the cylinder illustrating the castillated retainer sleeve.

Fig. 10 is a rear view of an automotive vehicle, showing my automatic adjusting mechanism associated with the axle.

In the drawings in which I have shown the preferred embodiment of my invention, the numeral 12 indicates a vehicle axle of conventional design; springs 13 are mounted thereon, and dual wheels B are provided on the outer ends of the axle in the usual manner.

A split clevis member 14 is secured to the axle 12 by means of bolts as usual, and one end of a lever beam 15 is hingedly secured thereto by means of the pin 16. A yoke 17 is mounted on the axle and is slotted as at 18 to accommodate the beam, all as clearly shown in Fig. 4 of the drawings.

The free inner end of the axle is formed with an upwardly projecting overhanging head 19 and is engaged by the piston 20 which forms a part of the hydraulic or pressure mechanism which is mounted on the axle. The pressure mechanism comprises a flanged pedestal 21 which is clamped on the axle shaft, being split on the line 22, and bolts 23 are provided to secure the members in clamped relation on the shaft. A cylinder 24 is mounted on the pedestal 21 by means of studs 25, and a piston 26 is mounted in said cylinder, said piston being formed with the projecting piston rod portion 20 which engages the overhanging end 19 of the beam 15 as above noted.

A cylinder head 27 forms a closure for the open end of the cylinder 24 and is held in position by means of studs 28 as usual, said head being suitably bored to accommodate the projecting rod 20 of the piston 26, a filling port 29 being provided in said head to facilitate introduction of fluid to said cylinder which serves as the reservoir.

The base of the cylinder 24 is formed as clearly shown in Fig. 5 of the drawings, a centrally disposed pump passage 30 being provided as shown, and a piston 31 is reciprocatingly mounted therein, a rod 32 being connected to said piston, the end of the rod projecting beyond the cylinder and into engagement with the sinuous cam face of a plunger member 33, the end of the passage 30 being counterbored and threaded, and a packing nut 34 is threaded therein and secures the packing 35 in position, a spring 36 being interposed between the opposite end of the passage and the piston, forcing said piston into engagement with the sinuous face of the plunger.

Transversely disposed passages 37 and 38 respectively are also provided on the cylinder block for establishing communication with the passage 30, and are formed as clearly shown in Fig. 6 of the drawings, the passage 37 being reduced as at 39 and forming a seat for a ball valve 40, a grooved ball socket 41 engaging said ball, and a spring 42 is interposed between the socket and a plug 43 which forms a closure for the end of the passage, a reduced orifice 44 establishing communication between the passage 37 and the cylinder.

A retainer sleeve 45 is mounted in the opposite passage 38, one end being shaped to engage the ball valve 46, the opposite end being castillated as at 47 (see Fig. 9), and a passage 48 leads through said sleeve, a plug 49 forming a closure for the passage 38 as usual. A serrated member 50 is also mounted in the passage 38 and forms a seat for the ball 46, and a spring 51 is interposed between the member 50 and the reduced end 52 of the passage, an inclined passage 53 leading from the outer end of the passage 38 and opens into the cylinder at a point directly adjacent the head.

A vertically disposed passage 54 communicates with the chamber 37, the lower end being reduced to form a ball seat for the ball valve 55, the upper end being enlarged and threaded and is adapted to receive the threaded end of a sleeve 56 in which the pin 57 is mounted, said pin being spirally grooved as at 58, and a key 59 is mounted in a yoke 60 and engages in said groove. A support 61 is mounted on the cylinder head and is also bored to receive said pin which is slidably mounted therein.

An inclined passage 62 leads from the passage 54 into the cylinder as shown, and a serrated disc 63 is mounted on the ball valve 55, a spring 64 being interposed between said disc and the end of the pin 57 to regulate the pressure in relation to the load.

The force pump embodied in this pressure mechanism is actuated by the flexing of the vehicle springs 13 and which support the vehicle body "C" which is mounted in the conventional manner, a bracket 65 being connected to said body, and a rod 66 is connected to said bracket, being formed with an eye 67 so that a flexible joint is provided. The plunger 33 is secured to or formed integral with the rod 66, said plunger being slidably mounted between the elliptic segments 68, and the plate 69 serves as a guide for the plunger.

The pin 57 is actuated by means of an angularly disposed cam rod 70 which is secured to and depends from the vehicle body "C", the free end extending through the slotted opening 71 provided in the yoke 60, and it will be obvious that as the vehicle springs are flexed, that the pin 57 will rotate through a limited arc, moving downwardly by reason of the engagement of the key 59 in the spiral groove 58, compressing the spring 64, and thus regulating the pressure necessary to open the ball valve 55.

The flexing of the springs 13 also actuates the plunger 33, and the cam faced edge reciprocates the piston 30 accordingly; this reciprocation of the piston draws fluid through the passage 53 downwardly to the passage 38, thus forcing fluid through the orifice 44, and building up pressure beneath the piston, and when the built-up pressure exceeds that required to suspend the load, the pressure raises the valve 55 so that fluid flows through the passage 62 and into the space above the piston, the downward pressure of the pin 57 regulating the operation of the valve 55 so that the load and pressure are automatically regulated and in direct ratio.

A permanent ultimate load valve is provided in the piston (see Fig. 7), and comprises a plug 73 which is threaded in the piston. This is formed with a reduced passage 74 opening into an enlarged passage 75, the passage 74 being controlled by a ball valve 76, and a serrated disc 77 is mounted thereon; a plug 78 is threaded into the passage 75 which is formed with a centrally disposed orifice 79, and a spring 80 is interposed between the plug and the serrated disc, said load valve being set for operation when the load capacity is exceeded.

A breather 81 is provided in the cylinder head and can be of any desired design, and it is not deemed necessary to describe this in detail, as it is conventional in operation and construction.

This movement of the piston which is in engagement with the end of the beam, automatically adjusts the axle camber at all times, holding it true and preventing deflection.

From the foregoing description it will be obvious that I have perfected a very simple, practical, and inexpensive automatic axle adjusting mechanism for automotive vehicles.

What I claim is:

1. An axle adjusting mechanism adapted to be connected to an axle shaft and comprising a lever beam, and a pressure actuated means mounted on said axle and engaging said lever beam for maintaining said axle in true horizontal alignment.

2. An axle adjusting mechanism including an axle, a lever beam having one end pivotally secured thereto, a pressure actuated mechanism mounted on said axle and engaging said lever beam, and means for actuating said pressure mechanism.

3. An axle adjusting mechanism including an axle, a lever beam pivotally connected thereto, a pressure actuated mechanism mounted on said axle and engaging said beam, a yoke connecting said beam and axle at a point remote from the pivoting point, and means for actuating said pressure mechanism.

4. An axle adjusting mechanism including an axle, a lever beam pivotally connected to the axle at a point adjacent one end thereof, a pressure mechanism mounted on the axle and in engagement with the free end of the lever beam, a yoke connecting said axle and beam, and means for actuating said pressure mechanism.

5. An axle adjusting mechanism including an axle, a suspension beam hingedly connected thereto at a point adjacent the one end of the axle, a pressure mechanism mounted on the axle and adjustably engaging the free end of the beam, a yoke interposed between the hinging point and pressure mechanism and embracing said beam and axle, and means for actuating said pressure mechanism to maintain the axle in true horizontal alignment.

6. An axle adjusting mechanism including an axle, a lever beam pivotally secured thereto at a point directly adjacent one end thereof, a pressure mechanism mounted on the axle and including a piston engaging the free end of the lever beam, a yoke connecting the beam and axle at a point intermediate the pivoting point and the pressure mechanism, and means for actuating said mechanism to regulate said piston and hold the axle in true horizontal alignment.

7. An axle adjusting mechanism including an axle, a suspension beam having its one end pivotally secured thereto, a pressure mechanism mounted on the axle and including a piston engaging the free end of the beam, a yoke interposed between the pivoting point and the pressure mechanism, and a rod connected to the vehicle body and to the mechanism for actuating said piston to hold the axle in true horizontal alignment.

8. An axle adjusting mechanism adapted to be connected to a vehicle axle, and including a lever beam pivotally connected to said axle at a point directly adjacent the end thereof, a pressure mechanism clamped on the axle and including a piston engaging the free end of said beam, a yoke embracing said beam and axle at a point intermediate the pivoting point and the mechanism, a rod connected to the vehicle and to the mechanism for creating a pressure beneath the piston to hold the axle in true alignment, and means for varying the pressure in direct ratio to the load.

9. An axle adjusting mechanism including an axle, a lever beam connected thereto at a point directly adjacent one end of the axle, a pressure mechanism mounted on the axle and engaging the free end of the beam, a yoke connecting the beam and axle, means for actuating the pressure mechanism, and means for regulating the pressure in direct relation to the load carried by the axle.

10. An axle adjusting mechanism including a vehicle axle, a lever beam connected to the axle adjacent one end thereof, a pressure mechanism engaging the free end of said beam, a yoke connecting the beam and axle at a point intermediate its length, means connected to the vehicle for actuating the pressure mechanism, and means also connected to the vehicle body for varying the pressure in direct relation to the load.

CASIMIR SIEMIANA.